United States Patent

Hayakawa et al.

Patent Number: 5,674,146
Date of Patent: Oct. 7, 1997

[54] DIFFERENTIAL GEAR APPARATUS

[75] Inventors: Hideo Hayakawa; Seiki Numao; Satoshi Aiba; Kenji Hiraishi, all of Tochigi, Japan

[73] Assignee: Tochigi Fuji Sangyo Kabushiki Kaisha, Japan

[21] Appl. No.: 514,105

[22] Filed: Aug. 11, 1995

[30] Foreign Application Priority Data

Aug. 12, 1994 [JP] Japan .................. 6-190393

[51] Int. Cl.$^6$ .................. F16H 1/45; B60K 17/20
[52] U.S. Cl. .................. 475/248; 475/249; 475/252
[58] Field of Search .................. 475/248, 259, 475/250, 252; 74/606 R

[56] References Cited

U.S. PATENT DOCUMENTS

| | | | |
|---|---|---|---|
| 5,221,238 | 6/1993 | Bawks et al. | 475/226 |
| 5,518,464 | 5/1996 | Teraoka | 475/249 X |
| 5,562,562 | 10/1996 | Teraoka | 475/252 X |
| 5,616,096 | 4/1997 | Hagiwara | 475/249 |

FOREIGN PATENT DOCUMENTS

| | | |
|---|---|---|
| 0356401 | 2/1990 | European Pat. Off. . |
| 0563895 | 10/1993 | European Pat. Off. . |
| 5293134 | 2/1972 | Japan . |

Primary Examiner—Khoi Q. Ta
Attorney, Agent, or Firm—Brown, Martin, Haller & McClain

[57] ABSTRACT

A differential gear apparatus includes a differential case 21 having casing members 31,33 fixed by a tightening member 35 and driven by an engine to be rotated, side gears 37,39 on the wheel side, pinion gears 57,59 for linking the gears 37,39 with each other, and receiving bores 53,55 formed of first and second wall surfaces 77,79,83,85 which are respectively formed in the casing members 31,33 for receiving the pinion gears 57,59 slidably and rotatably therein, wherein wall surfaces 77,79 occupy semicircles or more of the receiving bores 53,55, and curvatures of the wall surfaces 83,85 are set to be larger than those of the wall surfaces 77,79 and wherein distances between the wall surfaces 83,85 and the pinion gears 57,59 are set to be longer than distances between the wall surfaces 77,79 and the pinion gears 57,59 in contacting areas of respective wall surfaces.

12 Claims, 6 Drawing Sheets

DIFFERENTIAL GEAR APPARATUS

BACKGROUND OF THE INVENTION

1. Field of the Invention

The present invention relates to a differential gear apparatus for use in vehicles.

2. Description of the Related Art

FIGS. 1 and 2 show a conventional differential gear apparatus 201, and FIG. 3 shows a differential gear apparatus set forth in Utility Model Application publication (KOKAI) 52-93134. In these differential gear apparatuses 201,203, side gears 205,207,209,211 are linked with each other via the pinion gears 213,215,217,219. A driving force of an engine for rotating differential cases 221,223 is transmitted from respective pinion gears to wheels via respective side gears.

In the differential gear apparatus 201, the differential case 221 is constituted by tightening a casing main body 225 to a cover 227 by bolts. As shown in FIG. 2, respective pinion gears 213,215 are received in receiving bores 231,233 formed which are formed so as to extend over a boss portion 229 of the cover 227 and the casing main body 225. On the contrary, in the differential gear apparatus 203, respective pinion gears 217,219 are received in receiving bores 235, 237. These receiving bores 235,237 are formed so as to extend over a spacer 239 located between the side gears 209,211 and the differential case 223. Respective differential gear apparatuses 201, 203 can obtain a differential limiting force by frictional resistance caused between these receiving bores and the pinion gears or the like.

However, in the differential gear apparatus 201, as shown in FIG. 2, the receiving bores 231,233 are formed of wall surfaces 241,243 of the casing body case 225 and wall surfaces 245,247 of the boss portion 229. Therefore, if, for instance, a displacement in location is caused between the casing main body 225 and the cover (boss portion 229) in the circumferential direction or a processing error of the receiving bores 231,233 is caused, the pinion gears 213,215 are subjected to large rotational resistance because of their deviated contact to the received bores 231,233. As a result, proper differential distribution of the driving force cannot be attained, and also a normal differential limiting force cannot be achieved.

If the wall surfaces 245,247 on the side of the boss portion 229 is eliminated, problems such as the displacement in location and the deviated contact can be overcome. However, allotted load to the wall surfaces 241,243 of the casing main body 225 for supporting the pinion gears 213,215 is increased correspondingly in that degree, and the pinion gears 213,215 are supported incompletely so that the pinion gears 213,215 are engaged incorrectly with the side gears 205,207. Consequently, there has been caused various problems such as burning, uneven abrasion and the like.

In addition, in the differential gear apparatus 203, the spacer 239 is not fixed in the circumferential direction. Therefore, like the differential gear apparatus 201, there is caused such problem that the deviated contact between the pinion gears 217,219 and the receiving bores 235,237.

Therefore, an object of the present invention is to provide a differential gear apparatus capable of eliminating deviated contact between pinion gears and receiving bores therefor.

SUMMARY OF THE INVENTION

A differential gear apparatus according to a first invention comprises a differential case having a first casing member and a second casing member fixed mutually by a tightening member, and driven by a driving force of an engine to be rotated, a pair of side gears on the wheel side, pinion gears for linking said side gears with each other, and receiving bores formed of a first wall surface and a second wall surface which are respectively formed in said first casing member and said second casing member, for receiving said pinion gears slidably and rotatably therein, wherein a distance between said second wall surface and said pinion gears is longer than a distance between said first wall surface and said pinion gears in contacting areas of respective wall surfaces. A differential gear apparatus according to a second invention comprises a differential case driven by a driving force of an engine to be rotated, a pair of side gears on the wheel side, pinion gears for linking said side gears with each other, a spacer arranged between said side gears, and receiving bores formed of a first wall surface and a second wall surface which are respectively formed in said differential case and said spacer, for receiving said pinion gears slidably and rotatably therein, wherein a distance between said second wall surface and said pinion gears is longer than a distance between said first wall surface and said pinion gears in contacting areas of respective wall surfaces.

A differential gear apparatus according to a third invention is a differential gear apparatus according to claim 1 or 2 wherein said distance between said second wall surface and said pinion gears is made longer than said distance between said first wall surface and said pinion gears by setting $R_1 < R_2$, where $R_1$ is a radius of curvature of said first wall surface and $R_2$ is a radius of curvature of said second wall surface of said receiving bores which receives said pinion gears slidably and rotatably therein.

A differential gear apparatus according to a fourth invention is characterized in that first wall surface occupies a semicircle or more of respective receiving bores.

In the differential gear apparatus according to respective inventions, a distance between the second wall surface and the pinion gears is set to be longer than a distance between the first wall surface and the pinion gears. Thus, if displacements in location of the first wall surface and the second wall surface are caused slightly, these displacements in location can be absorbed by a large width of the second wall surface in the circumferential direction. As a result, deviated contact between the pinion gears and the receiving bores can be prevented, so that differential distributing function and differential limiting function of the driving force can be kept properly.

In addition, by forming the first wall surface in the semicircle or more of the receiving bore and setting the distance between the first wall surface and the pinion gears to the normal value, the pinion gears can be supported firmly. Therefore, engagements of the pinion gears with the side gears can be maintained good, and thus burning, uneven abrasion etc. are not caused.

BRIEF DESCRIPTION OF THE DRAWINGS

The present invention will be better understood from the following detailed description of preferred embodiments of the invention, taken in conjunction with the accompanying drawings, in which like reference numerals refer to like parts, and in which.

DETAILED DESCRIPTION OF THE EMBODIMENTS

Figure 4:
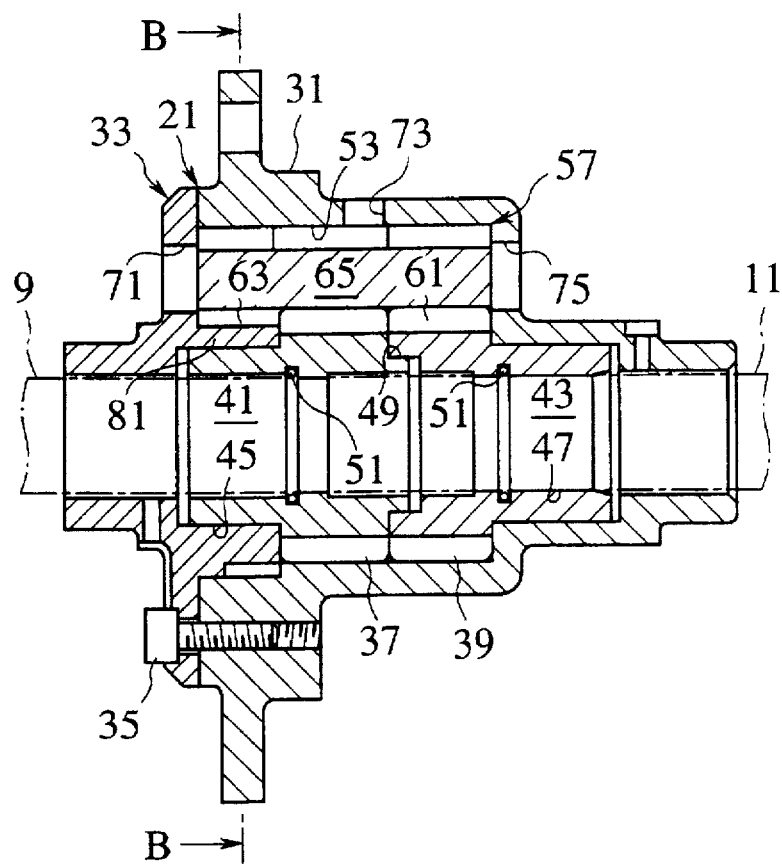
FIG. 4 is a sectional view showing a sectional shape of an embodiment of a first invention.
Figure 5:
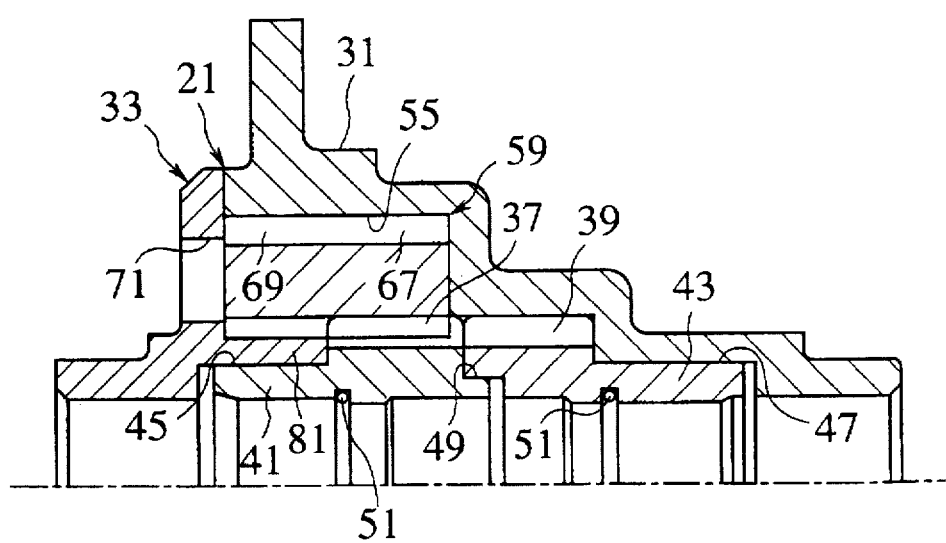
FIG. 5 is a sectional view showing another sectional shape of the embodiment shown in FIG. 4.

With reference to FIGS. 4, 5, 6 and 7, an embodiment of the first invention will be explained. This embodiment has a feature of the fourth invention. FIGS. 4 and 5 show respectively sectional shapes of the embodiment which is a differential gear apparatus mounted on front, center and rear of vehicles. Left and right directions coincide with those of the vehicles and those of FIGS. 4 and 5. In addition, members etc. not designated by symbols are not shown.

As shown in FIGS. 4 and 5, a differential case 21 is so constituted that a casing main body 31 (a first casing member) and a cover 33 (a second casing member) are tightened by a bolt 35 (tightening member). Left and right helical side gears 37,39 are arranged in the inside of the differential case 21.

Respective side gears 37,39 are formed respectively on hubs 41,43. Respective hubs 41,43 are supported by supporting portions 45,47 formed respectively between the casing main body 31 and the cover 33, and support each other via a supporting portion 49 formed between the supporting portions 45,47 to be centered. Respective side gears 37,39 are spline-connected respectively to rear wheel axes 9,11 via the hubs 41,43 and fixed by a retaining ring 51.

In the differential case 21, four sets of long and short receiving bores 53,55 are formed at an equal distance in the circumferential direction. Long and short helical pinion gears 57,59 are respectively received in the receiving bores 53,55 slidably and rotatably.

The long pinion gear 57 comprises a first gear portion 61 and a second gear portion 63, a shaft portion 65 of small radius used for coupling to each other. The first gear portion 61 engages with the right side gear 39. In addition, the short pinion gear 59 is formed of a first gear portion 67 and a second gear portion 69, both being formed integrally. The first gear portion 67 engages with the left side gear 37. The second gear portion 69 engages with the second gear portion 63 of the pinion gear 57.

As shown in FIGS. 4 and 5, openings 71,73 and 75 are formed in the differential case 21 to lubricate the receiving bores 53,55 and engaging portions of respective gears, by supplying oil from an oil pump of a differential carrier to therethrough.

A driving force of an engine to rotate the differential case 21 is distributed from the pinion gears 57,59 to left and right side gears 37,39. If a difference in driving resistance is caused between the side gears 37,39, the driving force of the engine is differentially distributed into respective left and right sides because of rotation of the pinion gears 57,59 on their own axes.

While the driving force is differentially distributed, the pinion gears 57,59 are pressed against the receiving bores 53,55 by a reaction force between the pinion gears 57,59 and the side gears 37,39 to thus generate frictional resistance. Also, frictional resistance are generated by thrust forces of the helical gears between the pinion gears 57,59 and the differential case 21 and between the side gears 37,39 and the differential case 21. Because of these frictional resistance, a torque sensitive type differential limiting force can be derived.

Figure 6:
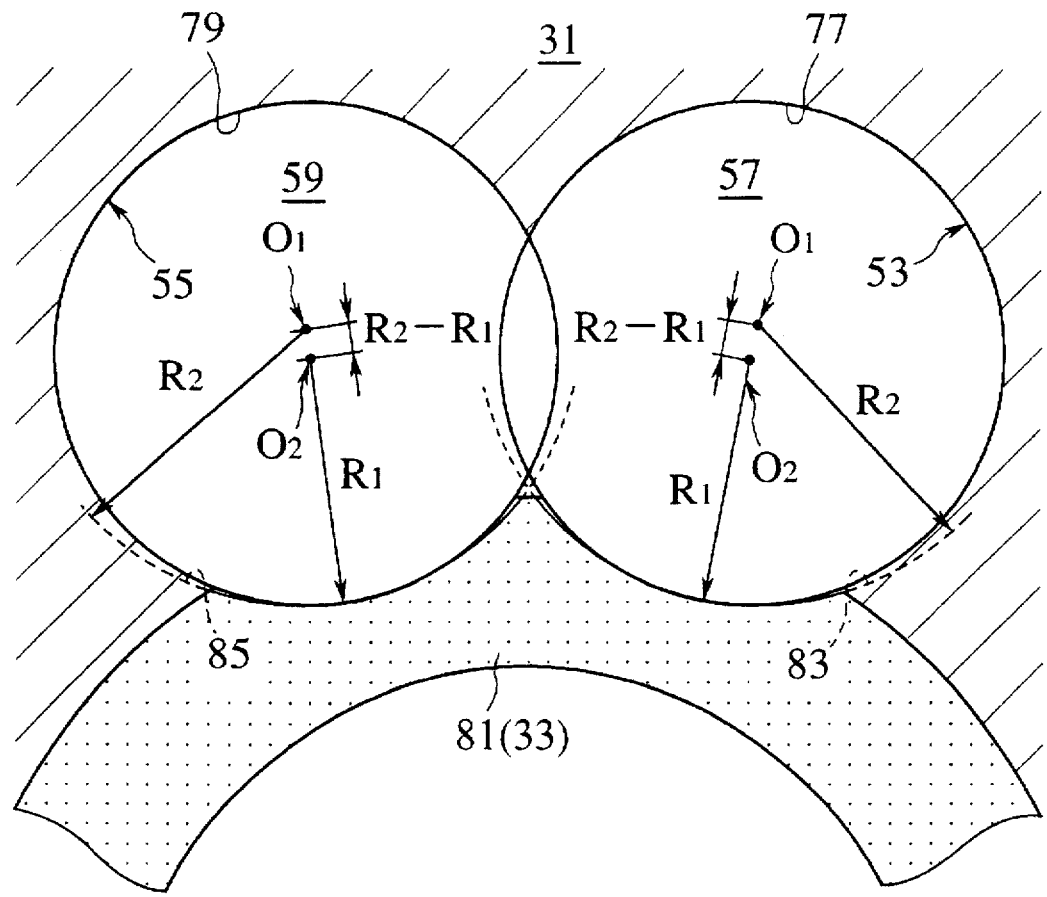
FIG. 6 is an enlarged sectional view showing a sectional shape of pertinent portions of the embodiment shown in FIG. 4 taken along a B—B face.

As shown in FIG. 6, in engaging portions of the pinion gears 57,59 (second gear portions 63,69), the receiving bores 53,55 are composed of the wall surfaces 77,79 of the casing main body 31 (first wall surface) and the wall surfaces 83,85 of the boss portion 81 of the cover 33 (second wall surface). Radii $R_2$ (radius of curvature $R_2$) of the wall surfaces 83,85 of the boss portion 81 are formed to be larger than radii $R_1$ (radius of curvature $R_1$) of the wall surfaces 77,79 of the casing main body 31 ($R_1 < R_2$).

Figure 7:
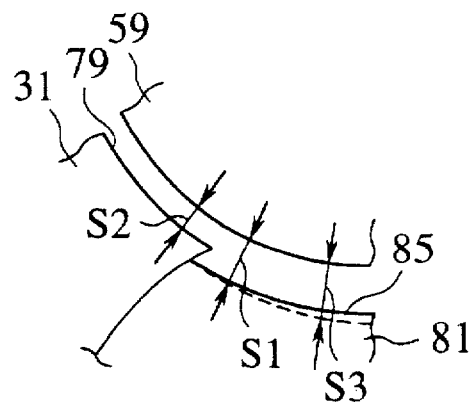
FIG. 7 is an enlarged sectional view showing main portions in FIG. 6.

Therefore, as shown in an enlarged manner in FIG. 7, a space $S_1$ between the pinion gear 59 and the boss portion 81 (wall surface 85) is formed larger than a space $S_2$ between the pinion gear 59 and the casing main body 31 (wall surface 79). Similarly, a space $S_1$ between the pinion gear 57 and the wall surface 83 is formed larger than a space $S_2$ between the pinion gear 57 and the wall surface 77. In addition, centers $O_1$ of the wall surfaces 83,85 are retreated from centers $O_2$ of the wall surfaces 77,79 toward the outside by a distance $(R_2-R_1)$ in the radius direction of the differential case 21.

Like this, if, for example, the displacement in location is caused between the casing main body 31 and the cover 33 in the circumferential direction, such displacement in location can be absorbed within the space $S_2$ since the space $S_1$ is set to be larger than the space $S_2$. Therefore, deviated contacts caused between the pinion gears 57,59 and the wall surfaces 83,85 respectively can be prevented. As a result, the pinion gears 57,59 can be rotated smoothly at the time of differential operation, and therefore differential distribution function of the driving force and differential limiting function caused by the above frictional resistance can be maintained properly.

Moreover, it is preferable that radii $R_2$ of the wall surfaces 83,85 should be selected in a range of 1.04 to 1.1times the radius of addendum circle of the pinion gear. In addition, if, as shown in FIG. 7, a space $S_3$ is formed between the boss portion 81 of respective pinion gears and the wall surfaces 83,85 by placing centers of the radii $R_1, R_2$ on the same location as centers of respective pinion gears, the space $S_3$ can be formed larger than the space $S_1$. Consequently, the displacement in location between the casing main body 31 and the cover 33 in the circumferential direction can be absorbed, resulting in the same advantage as that obtained in case the radius of curvature is changed.

Since the wall surfaces 77,79 which receive the engagement reaction force of the pinion gears 57,59 can occupy more than semicircles of the receiving bores 53,55 so as to hold the pinion gears 57,59 firmly, the engagement of the pinion gears 57,59 with the side gears 37,39 can be kept well. As a result, burning, uneven abrasion etc. are not caused.

As described above, the differential gear apparatus can be achieved.

Figure 8:
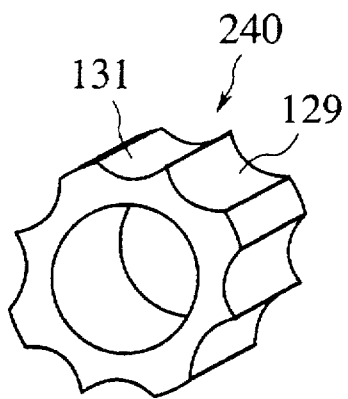
FIG. 8 is a perspective view showing a spacer used in an embodiment of a second invention.

Next, with reference to FIGS. 8 and 9, an embodiment of a second invention will be explained. This embodiment has a feature of a fourth invention.

Figure 1:
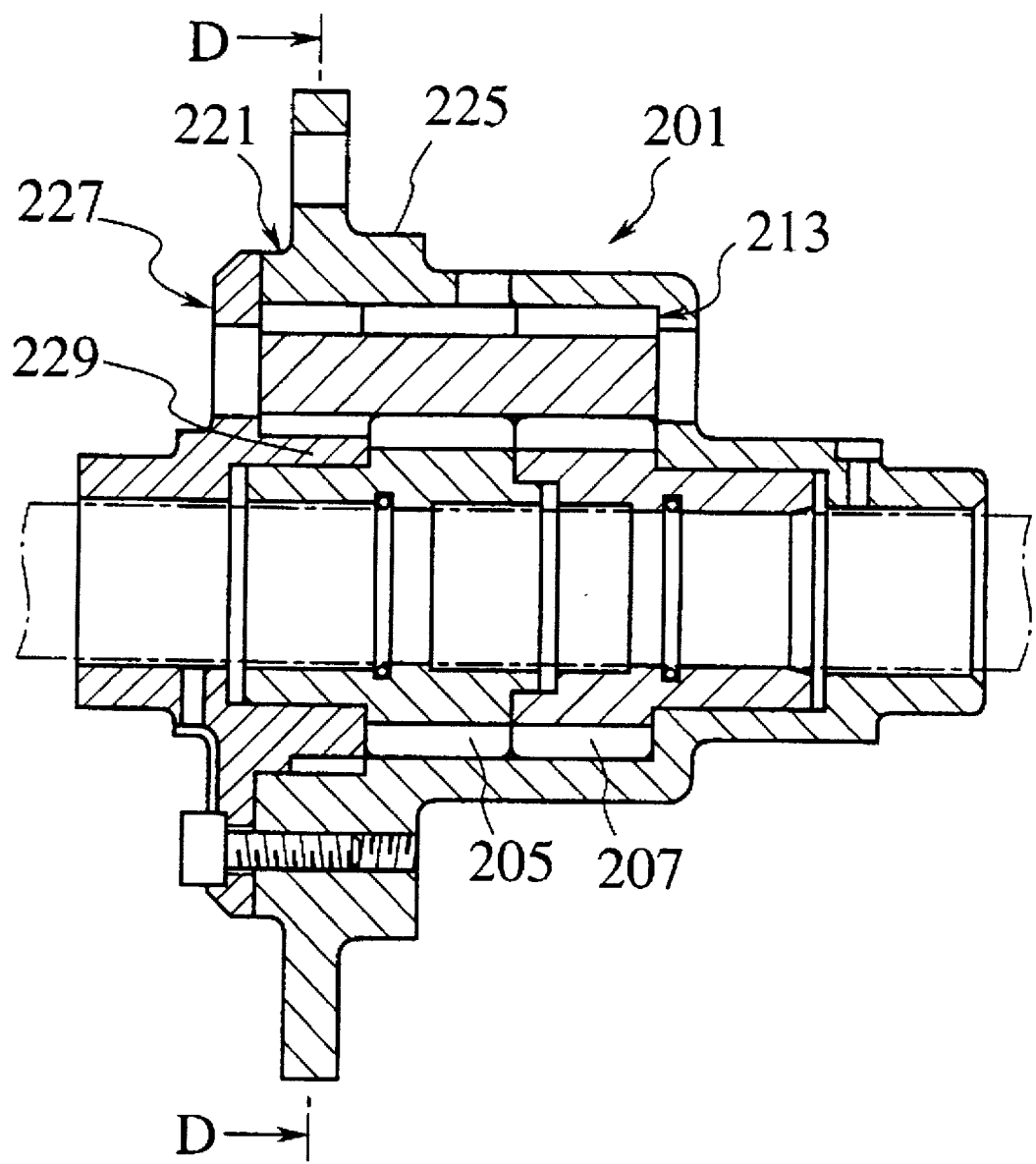
FIG. 1 is a sectional view showing a sectional shape of a conventional example.
Figure 2:
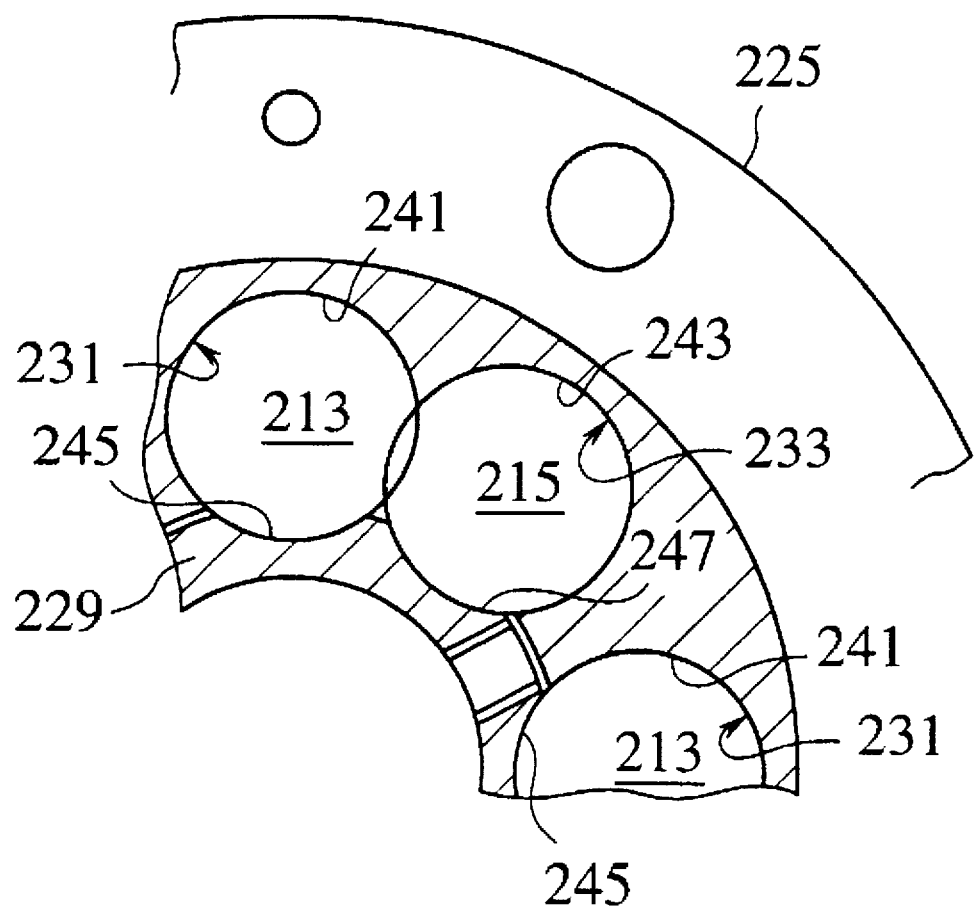
FIG. 2 is an enlarge sectional view showing a sectional shape of pertinent portions of the conventional example shown in FIG. 1 taken along a D—D face.
Figure 3:
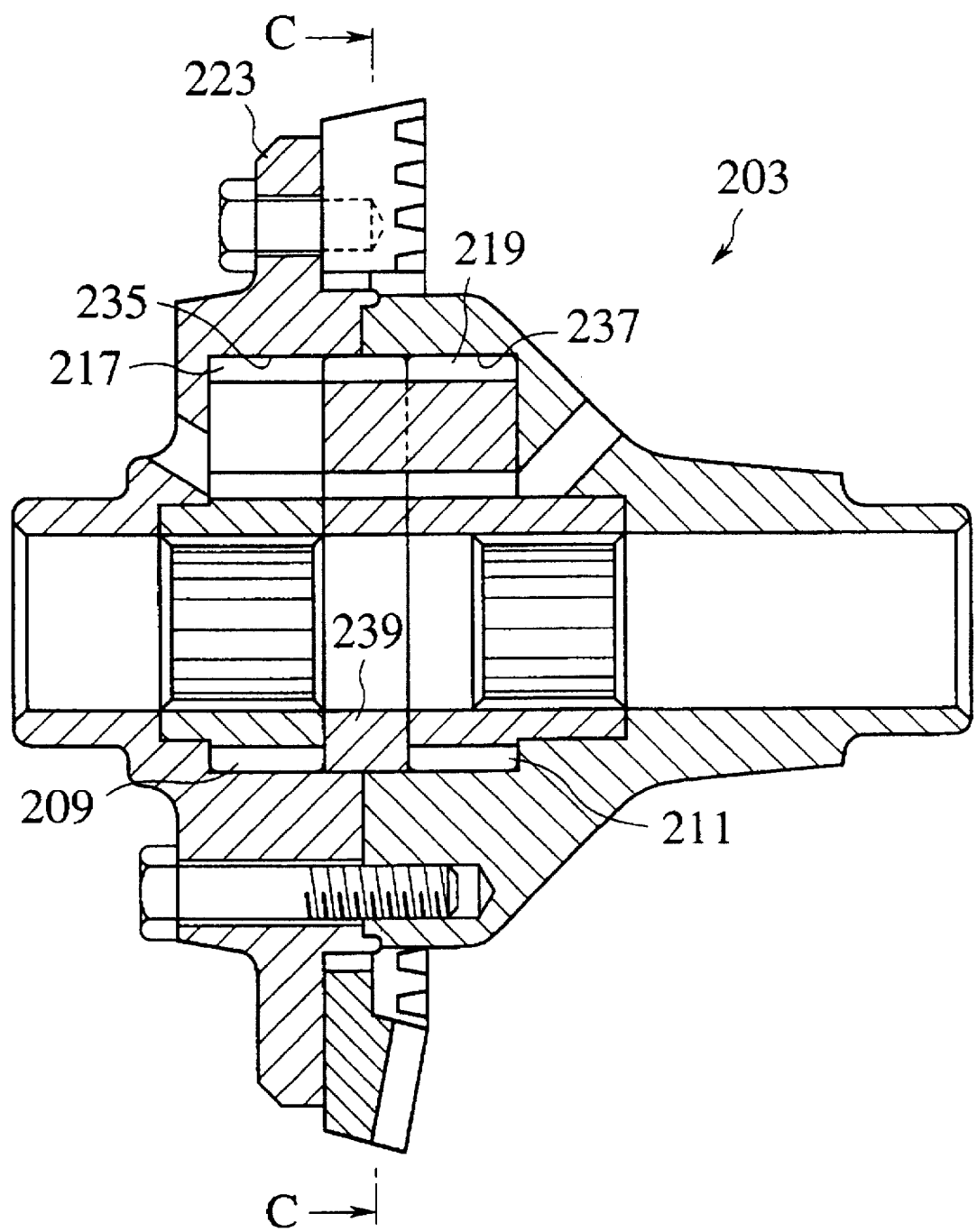
FIG. 3 is a sectional view showing a sectional shape of another conventional example.

A differential gear apparatus of the present embodiment comprises substantially identical constituent members to those of the conventional differential gear apparatus 203 shown in FIG. 3 except for characterizing members used for the present invention. Therefore, such identical constituent members will be explained by affixing the same references. Left and right helical side gears 209,211 are arranged in the inside of the differential case 223.

Also, in the differential case 223, four sets of receiving bores 235,237 are formed at an even distance in the circumferential direction. Helical pinion gears 217,219, each having an equal length, are respectively received in the receiving bores 235,237 slidably and rotatably.

The driving force of the engine to rotate the differential case 223 is distributed to left and right side gears 209,211. If a difference in driving resistance is caused between the side gears 209,211, the driving force is differentially distributed into respective left and right sides because of rotation of the pinion gears 217,219 on their own axes. In addition, like the above embodiments, the torque sensitive type differential limiting force can be derived by frictional resistance caused by the reaction force and the thrust force while the driving force is distributed differentially.

Figure 9:
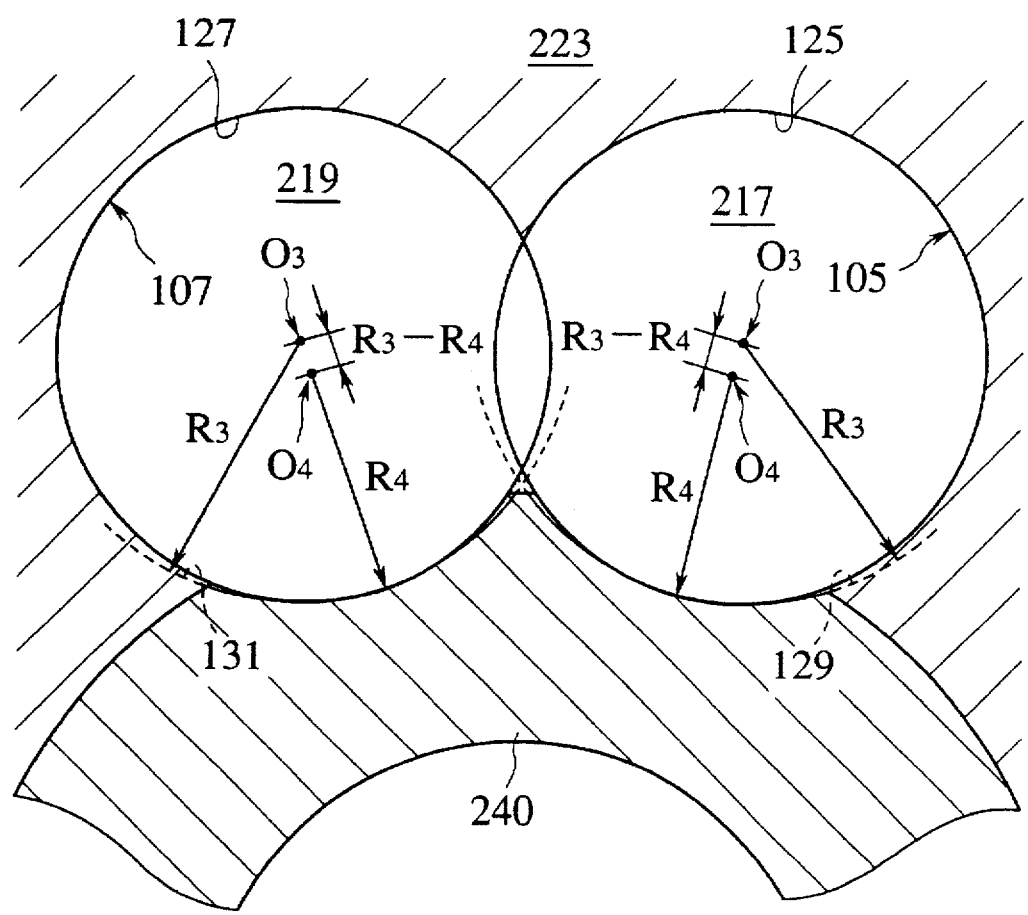
FIG. 9 is an enlarged sectional view taken along a C—C face of pertinent portions of the example shown in FIG. 3 to which the second invention is applied.

As shown in FIG. 9, in engagement portions of the pinion gears 217,219, the receiving bores 235,237 are composed of the wall surfaces 125,127 of the differential case 223 (first wall surface) and the wall surfaces 129,131 of the spacer 240 (second wall surface). The spacer 240 is fixed to the differential case 223 integrally by bolts or the like. Radii $R_3$ (radius of curvature $R_3$) of the wall surfaces 129,131 of the spacer 240 are formed to be larger than radii $R_4$ (radius of curvature $R_4$: same as $R_1$ in the above embodiment) of the wall surfaces 125,127 of the differential case 223. Therefore, a space between the pinion gears 217,219 and the spacer 240 (wall surfaces 129,131) is formed larger than a space between the pinion gears 217,219 and the differential case 223 (wall surfaces 125,127). In addition, centers $O_4$ of the wall surfaces 129,131 are retreated from centers $O_4$ of the wall surfaces 125,127 toward the outside by a distance $(R_3\_R_4)$ in the radius direction of the differential case 223.

As has been discussed, if the displacement in location is caused between the differential case 223 and the spacer 240 in the circumferential direction, such displacement in location can be absorbed within the wide space on the spacer side since the space between the pinion gears 217,219 and the spacer 240 is set to be larger than the space between the pinion gears 217,219 and the differential case 223.

Therefore, deviated contacts caused between the pinion gears 217,219 and the wall surfaces 129,131 respectively can be prevented. As a result, the pinion gears 217,219 can be rotated smoothly at the time of differential operation, and therefore both differential distribution function of the driving force and differential limiting function caused by the above frictional resistance can be maintained properly.

Moreover, it is preferable that radii $R_3$ of the wall surfaces 129,131 should be selected in a range of 1.04 to 1.1 times the radius of addendum circle of the pinion gear. The wall surfaces 125,127 which receive the engagement reaction force of the pinion gears 217,219 can occupy more than semicircles of the receiving bores 235,237 so as to hold the pinion gears 217,219 firmly. Therefore, the engagement of the pinion gears 217,219 with the side gears 209,211 can be kept well. As a result, burning, uneven abrasion etc. are not caused.

As described advance, the differential gear apparatus can be attained.

In respective embodiments above, curvatures of all surfaces have been formed larger than that of the first wall surface (this has the same meaning that the radius of curvature becomes large). Alternatively, note that a width of the second wall surface in the circumferential direction may be increased by scraping off a portion near the edge portion in the circumferential direction in such a manner as chamfer, for example, so that a space can be generated between outer diameters of the pinion gears and the wall surfaces of the receiving bores for the pinion gears. Other portions of the differential gear apparatus may be formed to have the same curvature as the first wall surface.

In the differential gear apparatus according to respective inventions, the receiving bores of the pinion gears are formed by the first and second wall surfaces, and the width of the second wall surface in the circumferential direction is formed larger than that of the first wall surface in contact areas of respective wall surfaces. Therefore, if displacement in location of the first wall surface and the second wall surface are caused slightly, these location displacements can be absorbed by a large width of the second wall surface in the circumferential direction. As a result, deviated contact between the pinion gears and the receiving bores can be prevented, so that differential distributing function and differential limiting function of the driving force can be kept properly.

In addition, since, by forming the first wall surface in the semicircle or more of the receiving hole, the pinion gears can be supported firmly, engagements of the pinion gears with the side gears can be maintained good. As a result, burning, uneven abrasion etc. are not caused.

Although some preferred embodiments of the invention have been described above by way of example only, it will be understood by those skilled in the field that modifications may be made to the disclosed embodiments without departing from the scope of the invention, which is defined by the appended claims.

We claim:

1. A differential gear apparatus comprising:
   a differential case having a first casing member and a second casing member fixed mutually by a tightening member, and driven by a driving force of an engine to be rotated;
   a pair of side gears;
   pinion gears for linking said side gears with each other; and
   receiving bores formed of a first wall surface and a second wall surface which are respectively formed in said first casing member and said second casing member, for receiving said pinion gears slidably and rotatably therein;
   wherein a distance between said second wall surface and said pinion gears is longer than a distance between said first wall surface and said pinion gears in contacting areas of respective wall surfaces.

2. A differential gear apparatus according to claim 1, wherein where $R_1$ is a radius of curvature of said first wall surface and $R_2$ is a radius of curvature of said second wall surface of said receiving bores which receives said pinion gears slidably and rotatably therein, $R_1$ and $R_2$ are set as $R_1<R_2$.

3. A differential gear apparatus according to claim 1, wherein said first wall surface occupies a circumference of at least a semicircle of respective receiving bores.

4. A differential gear apparatus according to claim 2, wherein said first wall surface occupies a circumference of at least a semicircle of respective receiving bores.

5. A differential gear apparatus, comprising:

a differential case rotatable in response to a driving force of an engine;

a pair of side gears for connection to respective wheel axes;

pinion gears for linking said side gears with each other; a first wall surface and a second wall surface forming receiving bores for receiving said pinion gears slidably and rotatably therein, each receiving bore having an inner circumferential surface, said first wall surface being more than a half of the inner circumferential surface of said receiving bores; and a distance between said second wall surface and said pinion gears being longer than a distance between said first wall surface and said pinion gears in contacting areas of the respective wall surfaces.

6. A differential gear apparatus according to claim 5, wherein where $R_1$ is a radius of curvature of said first wall surface and $R_2$ is a radius of curvature of said second wall surface of said receiving bores which receives said pinion gears slidably and rotatably therein, $R_1$ and $R_2$ are set as $R_1 < R_2$.

7. A differential gear apparatus according to claim 5, wherein said first wall surface occupies a circumference of at least a semicircle of respective receiving bores.

8. A differential gear apparatus according to claim 6, wherein said first wall surface occupies a circumference of at least a semicircle of respective receiving bores.

9. The apparatus as claimed in claim 5, wherein the differential case includes an outer casing portion and an inner member fixed to the outer casing portion, the first wall surface being provided on the outer casing portion and the second wall surface being provided on the inner member.

10. The apparatus as claimed in claim 9, wherein the inner member comprises a spacer arranged between said side gears.

11. The apparatus as claimed in claim 9, including a cover member secured to one end of said outer casing portion, said cover member having a boss projecting into said outer casing portion, said boss comprising said inner member.

12. A differential gear apparatus, comprising:

a differential case rotatable in response to a driving force of an engine, the differential case including an outer casing portion and an inner member fixed at least against rotation relative to the outer casing portion;

a pair of side gears for connection to respective wheel axes;

pinion gears for linking said side gears with each other;

a first wall surface on the outer casing portion and a second wall surface on the inner member forming receiving bores for receiving said pinion gears slidably and rotatably therein, each receiving bore having an inner circumferential surface, said first wall surface being more than a half of the inner circumferential surface of said receiving bores; and a distance between said second wall surface and said pinion gears being longer than a distance between said first wall surface and said pinion gears in contacting areas of the respective wall surfaces.

* * * * *